United States Patent [19]

Matsui et al.

[11] Patent Number: 5,773,166

[45] Date of Patent: Jun. 30, 1998

[54] NON-AQUEOUS ELECTROLYTE SECONDARY BATTERY

[75] Inventors: Tooru Matsui, Fujiidera; Kenichi Takeyama, Osaka, both of Japan

[73] Assignee: Matsushita Electric Industrial Co., Ltd., Osaka-fu, Japan

[21] Appl. No.: 756,778

[22] Filed: Nov. 26, 1996

[30] Foreign Application Priority Data

Nov. 28, 1995 [JP] Japan ................................. 7-309381

[51] Int. Cl.$^6$ .................................................. H01M 4/60
[52] U.S. Cl. ........................ 429/212; 429/218; 429/190; 429/192; 429/194
[58] Field of Search ................... 429/218, 212, 429/213, 190, 192, 194

[56] References Cited

U.S. PATENT DOCUMENTS

| | | | |
|---|---|---|---|
| 4,735,875 | 4/1988 | Anderman et al. ................. | 429/194 |
| 4,853,305 | 8/1989 | Anderman et al. ................. | 429/212 |
| 5,143,805 | 9/1992 | Anderman et al. ................. | 429/217 |
| 5,498,492 | 3/1996 | Hara et al. ........................... | 429/212 |

FOREIGN PATENT DOCUMENTS

| | | |
|---|---|---|
| 0 579 921 A1 | 1/1994 | European Pat. Off. . |
| 2 640 801 A1 | 6/1990 | France . |
| 02 024975 A | 1/1990 | Japan . |
| 4-22072 | 1/1992 | Japan . |
| 07134989 | 5/1995 | Japan . |
| 07235296 | 9/1995 | Japan . |
| 07235328 | 9/1995 | Japan . |
| 09050802 | 2/1997 | Japan . |
| 9314529 | 7/1993 | WIPO . |
| WO 95/16286 | 6/1995 | WIPO . |

Primary Examiner—Bruce F. Bell

Attorney, Agent, or Firm—Panitch Schwarze Jacobs & Nadel, P.C.

[57] ABSTRACT

A non-aqueous electrolyte secondary battery employs a negative electrode which contains an alkali metal as an active material, and is provided with a polymer film thereon, the polymer film being provided with a gel electrolyte thereon. The polymer film is made of a polymeric monomer which has [molecular weight/terminal polymer functional group number] of 500 or less, and a structure represented by one of the formulas (1)–(4):

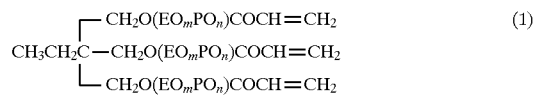

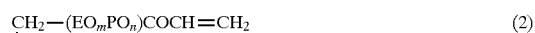

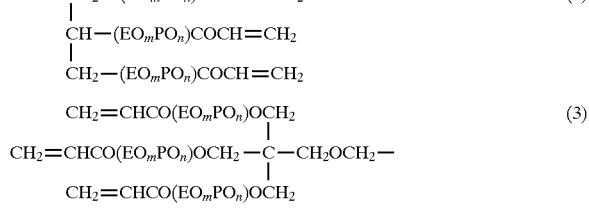

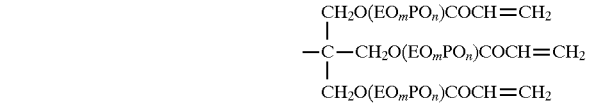

wherein EO refers to $CH_2CH_2O$, PO refers to $CH_2(CH_3)$ CHO, $(EO_mPO_n)$ indicates one of random polymerization and block polymerization, and wherein m and n do not represent 0 at the same time where $0 \leq m$ and $0 \leq n$.

3 Claims, 3 Drawing Sheets

NON-AQUEOUS ELECTROLYTE SECONDARY BATTERY

BACKGROUND OF THE INVENTION

1. Field of the Invention

The present invention relates to a non-aqueous electrolyte secondary battery and, more particularly, to an improvement of the interfacial characteristic between the electrolyte and the negative electrode.

2. Description of the Prior Art

Non-aqueous electrolyte batteries generally employ a negative electrode containing an alkali metal such as lithium as an active material, an electrolyte comprising an organic solvent such as propylene carbonate, γ-butyrolactone, dimethoxyethane, tetrahydrofuran, or dioxolan, and a solute, which is dissolved in the organic solvent, such as $LiClO_4$, $LiBF_4$, $LiAsF_6$, $LiPF_6$, or $LiCF_3SO_3$. These non-aqueous electrolyte batteries have been widely used these days for compact electronic appliances such as electronic watches and cameras by virtue of their high energy density.

One of the problems which prevent this type of non-aqueous electrolyte batteries from being rechargeable is that the alkali metal precipitates on the negative electrode during a charge process in the form of tree-branches, fibrils, or needles, which are referred to as dendrites. The overgrowth of the dendrites might cause internal short-circuits between the negative electrode and the positive electrode, thereby damaging the battery life in an instant. However, it is impossible to dissolve the entire dendrites during the subsequent discharge process because the dissolution of the dendrites proceeds in parts and some are electrically freed from the electrode plate. Consequently, the ratio of discharge amount (dissolution) to charge amount (precipitation) is decreased, deteriorating the charge/discharge efficiency.

To overcome the problem, the use of a polymer electrolyte in place of an electrolyte was proposed as a means of suppressing the formation of dendrite (Fast Ion Transport in Solids, North-Holland, New York, 1979, p. 131). The polymer electrolyte refers to a mixture of a polymer such as polyethylene oxide, which contains a polar atom such as oxygen in the molecular chains, and an alkali metal salt which is dissolved in the polymer and dissociated therefrom. A solvent (plasticizer) such as propylene carbonate may be added to the mixture. When such a solvent is added to the mixture, the mixture is referred to as a gel electrolyte. The polymer electrolyte, which contains no solvent, has poor ionic conductivity, failing to meet the characteristic required for the current electronic appliances, so that the gel electrolyte has drawn more attention.

When a non-aqueous electrolyte secondary battery employs the gel electrolyte, the alkali metal precipitates mostly in the form of globes, instead of dendrites which easily penetrated the electrolyte. However, the gel electrolyte still has a drawback that its charge/discharge efficiency is as low as in an organic electrolyte, that is, the short life of the negative electrode. This drawback results from the following grounds. During repeated charge/discharge cycles, an organic solvent oozes from the gel electrolyte onto the negative electrode, and this causes the globular precipitate to start to dissolve at the point of contact between the globular precipitate and the negative electrode. As a result, the globular precipitate frees from the negative electrode and is electrochemically inactivated. The more alkali metal frees from the negative electrode, the less alkali metal contributes to the battery reaction, making the life of the negative electrode shorter.

SUMMARY OF THE INVENTION

In view of the foregoing problem, the primary object of the present invention is to provide a highly reliable and long-lived non-aqueous electrolyte secondary battery by employing a negative electrode which prevents the alkali metal from precipitating in the form of dendrites during repeated charge/discharge cycles, and further prevents the alkali metal which has been precipitated in the form of globes from freeing from the negative electrode.

Another object of the present invention is to provide a method for manufacturing such a highly reliable and long-lived non-aqueous electrolyte secondary battery.

In order to achieve the primary object, the present invention provides a non-aqueous electrolyte secondary battery comprising:

a positive electrode, an alkali ion-conductive electrolyte, and a negative electrode containing an alkali metal as an active material, the negative electrode being provided with a polymer film thereon, the polymer film being made of a polymeric monomer having [molecular weight/terminal polymer functional group number] of 500 or less, and having a structure selected from the group consisting of formulas (1)–(4):

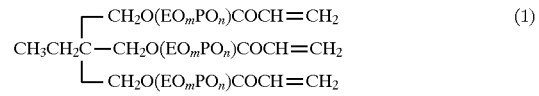

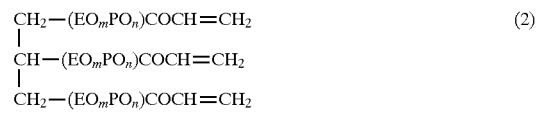

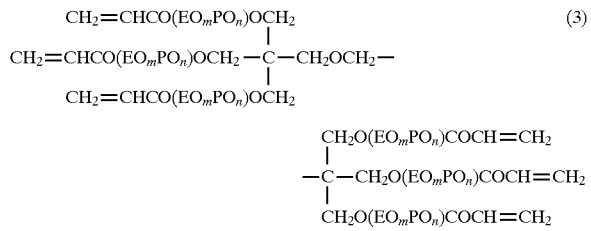

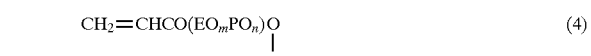

wherein EO refers to $CH_2CH_2O$, PO refers to $CH_2(CH_3)CHO$, $(EO_mPO_n)$ indicates one of random polymerization and block polymerization, and wherein m and n do not represent 0 at same time where $0 \leq m$ and $0 \leq n$.

The present invention provides a method for manufacturing a non-aqueous electrolyte secondary battery comprising the steps of:

preparing a solution consisting essentially of a monomer and an alkali metal salt, the monomer having [molecular weight/terminal polymer functional group number] of 500 or less, and having a structure selected from the group consisting of the above-mentioned formulas (1)–(4), applying the solution on the negative electrode, polymerizing the monomer in the solution to form a film containing dissociated ions of the alkali metal salt, and disposing a gel electrolyte onto the film.

While the novel features of the invention are set forth particularly in the appended claims, the invention, both as to organization and content, will be better understood and

DESCRIPTION OF THE PREFERRED EMBODIMENTS

Figure 1:
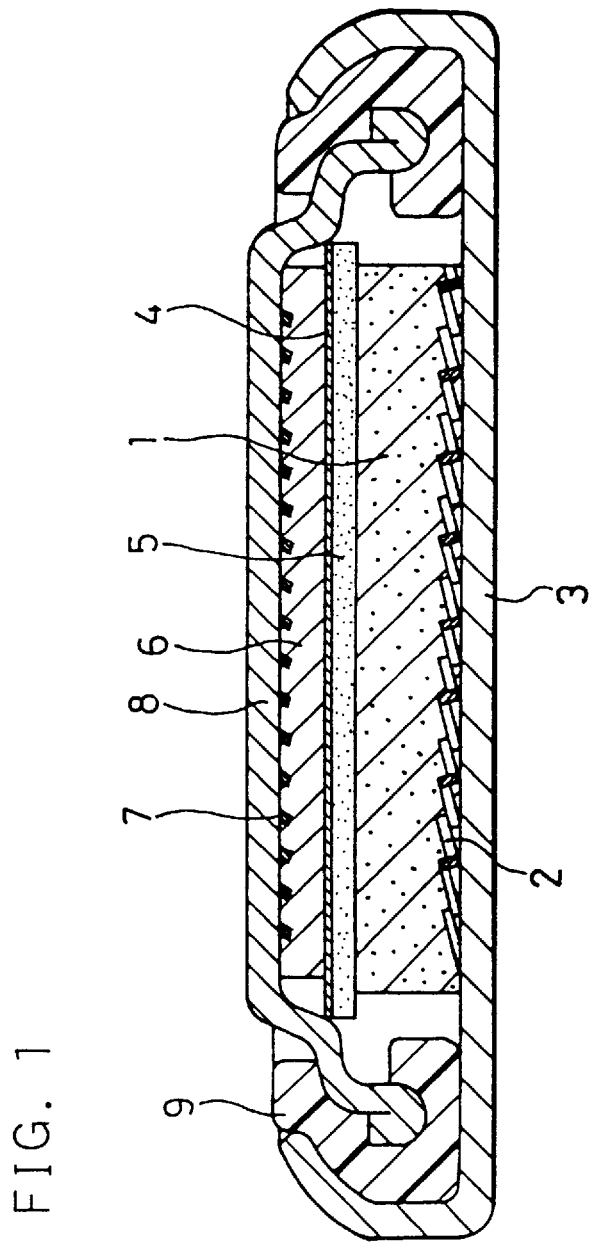
FIG. 1 is a vertical cross-sectional view of the flat-type batteries used in the embodiments of the present invention.

Generally, a film of a gel electrolyte is prepared by mixing a polymeric monomer, an electrolyte salt and a solvent (plasticizer), casting the mixture, and polymerizing the polymeric monomer containing dissociated ions of the electrolyte salt and the solvent. According to this method, the ions of an alkali metal such as lithium have been already solvated before the polymerization of the monomer, so that the prepared gel electrolyte film contains a large number of tunnels or cavities which allow the solvated ions to pass through. Consequently, while a charge/discharge cycle is repeated, solvent molecules are carried together with alkali metal ions onto the negative electrode. This causes the globular precipitate to start to dissolve at the point of contact between the globular precipitate and the negative electrode.

The polymer film to be disposed on the negative electrode of the present invention is prepared by mixing a polymeric monomer, an electrolyte salt, and a minimum amount of solvent (plasticizer) if the polymeric monomer does not dissolve the electrolyte salt sufficiently, spreading the resultant mixture over the negative electrode, and polymerizing the polymeric monomer. Consequently, the prepared polymer film contains few tunnels or cavities which are large enough to allow the solvated ions to pass through, so that there are few chances that the solvent molecules are carried onto the negative electrode during charge/discharge cycles. Thus, the polymer film of the present invention serves as a sieve of solvent molecules. If the polymeric monomer is solely polymerized without the electrolyte salt, no tunnels or cavities are formed in the polymer film, so that it does not serve as a sieve.

Such a polymer film serving as a sieve for molecules can be obtained by polymerizing a multifunctional polymeric monomer. The polymeric monomer has the right size to allow exclusively the alkali metal ions to pass through. The size is assessed by dividing the molecular weight of the polymeric monomer by the number of terminal polymer functional groups, which turns out to be about 500 or less. As for the thickness of the polymer film to be disposed on the negative electrode, the thicker it becomes, the larger the resistance of ion passing becomes. Thus, a practical polymer film is preferably not thicker than 10 $\mu$m.

If this polymer film and the gel electrolyte having alkali metal ion-conductivity are put together, the solvent is permeated into the polymer film from the gel electrolyte, and slightly widens the tunnels or cavities. As a result, the resistance of ion passing can be reduced, and an electrolyte film having a practical ionic conductivity is formed on the negative electrode. Although it is possible to use an organic electrolyte having ionic conductivity in place of the gel electrolyte, there is a problem that the solvent runs into and between the lithium sheet and the polymer film through the end of the sheet. Therefore, the gel electrolyte which can retain the solvent inside is superior in battery performance.

The following is a description of the embodiments of the present invention. All the embodiments were conducted under an argon atmosphere. Although lithium was used as an alkali metal, other alkali metals or an alloy of lithium and the other alkali metals can be used to obtain the same results.

EMBODIMENT 1

A saturated solution of LiPF$_6$ was prepared by mixing LiPF$_6$ with ethylene oxide-bound trimethylol propane triacrylate (ETMPA) represented by the formula (5) in which n=6.

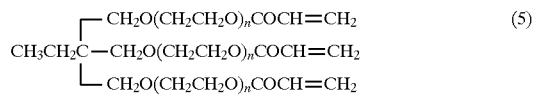
(5)

where n is an integer of 1 or more.

Then, a lithium sheet having a 300 $\mu$m thickness was soaked in this saturated solution for a whole day in order to fully moisten the lithium sheet with the saturated solution. Then, the lithium sheet was taken out, and extra saturated solution on the lithium sheet was removed with a blade. Then, ultraviolet rays of 43 mW/cm$^2$ were applied to the lithium sheet for 30 seconds, thereby polymerizing the saturated solution. The polymer film which was formed on the lithium sheet had a thickness of 5 $\mu$m.

A gel electrolyte film was then prepared as follows. Polyethylene glycol diacrylate whose average molecular weight of 8,000 and a propylene carbonate solution containing LiPF$_6$ (1 mol/L) were mixed in a weight ratio of 3:7. Then, 100 ppm of Irgacure 651 manufactured by Ciba-Geygy was added as an initiator to the mixture, thereby preparing a liquid for formulating the gel electrolyte. This liquid was cast onto the lithium sheet having the polymer film thereon, and exposed to 43 mW/cm$^2$ ultraviolet rays for 2 minutes, thereby producing the gel electrolyte film having a 100 $\mu$m thickness.

Instead of curing the liquid for formulating the gel electrolyte directly on the lithium sheet, it is possible to apply onto the lithium sheet a gel electrolyte film which has previously been cured by casting the liquid for formulating the gel electrolyte onto a quartz plate or the like. However, it is better to cure the liquid for formulating the gel electrolyte directly on the lithium sheet because this brings about an ion-conductive film with excellent electrochemical stability through the reaction between an unreacted polymeric functional group contained in the polymer film formed on the lithium sheet and a polymeric functional group contained in the liquid for formulating the gel electrolyte.

A flat-type battery shown in FIG. 1 was fabricated by employing an assembly of the polymer film, the gel electrolyte film, and the lithium sheet.

A positive electrode 1 was manufactured by mixing LiMn$_2$O$_4$ powder, carbon black and ethylene tetrafluoride resin powder, and press-molding the mixture onto an expanded metal current collector 2 made of titanium which has previously been spot-welded to the bottom of a positive electrode enclosure 3. The positive electrode 1 was filled with the aforementioned liquid for formulating the gel electrolyte in a vacuum, and then exposed to 43 mW/cm$^2$ ultraviolet rays for 2 minutes to cure its surface. The negative electrode, on the other hand, was manufactured by punching a lithium sheet 6 having a polymer film 4 and a gel electrolyte 5 thereon into a disk, and press-molding the disk onto an expanded metal 7 made of nickel which has previously been spot-welded to the bottom of a sealing plate 8. Finally the positive electrode enclosure 3 and the sealing plate 8 were engaged with each other, with a gasket 9 disposed therebetween, thereby obtaining the flat-type battery.

COMPARATIVE EXAMPLE 1

Another flat-type battery was manufactured in the same manner as in the first embodiment except that a lithium sheet having no polymer film thereon was used.

COMPARATIVE EXAMPLE 2

Another flat-type battery was manufactured in the same manner as in the first embodiment except that no $LiPF_6$ was added to ethylene oxide-bound trimethylol propane triacrylate (ETMPA).

COMPARATIVE EXAMPLE 3

Another flat-type battery was manufactured in the same manner as in the first embodiment except for the following points.

In preparing the gel electrolyte film, the liquid for formulating the gel electrolyte used in the first embodiment was cast onto a quartz plate or the like. After this, the liquid was exposed to 43 $mW/cm^2$ ultraviolet rays for 2 minutes thereby forming a gel electrolyte film having a 100 μm thickness as in the first embodiment. Then, the saturated solution for the polymer film used in the first embodiment was spread over this gel electrolyte film and exposed to ultraviolet rays for 30 seconds, thereby producing an assembly film of the polymer film and the gel electrolyte film. The assembly film and the lithium sheet were put together in a manner that the polymer film and the lithium sheet faced each other.

These batteries of the embodiment 1 and the comparative examples 1, 2 and 3 were repeatedly charged and discharged under the conditions of a temperature of 25° C., a current density of 0.25 $mA/cm^2$, a lower limit discharge voltage of 2.0 V, and an upper limit charge voltage of 3.5 V. The discharge capacity at each cycle of each battery was found, and the cycle life was regarded as ended when the discharge capacity dropped to half of the initial value.

Figure 2:
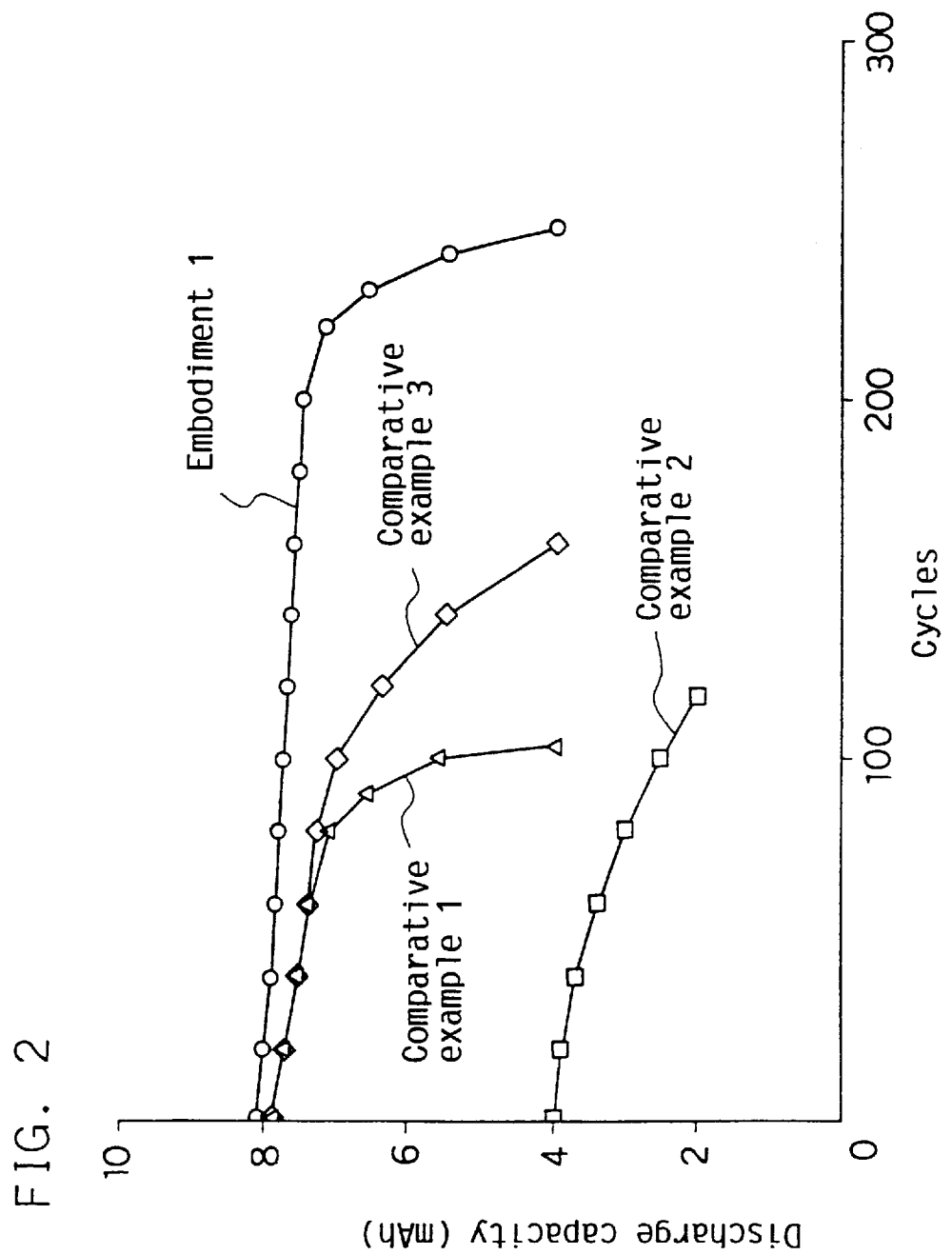
FIG. 2 is a graph showing the discharge capacity plotted for each cycle of the batteries used in an embodiment of the present invention and the comparative examples.

FIG. 2 is a graph showing the discharge capacity which was plotted for each cycle. This graph indicates that the battery of the first embodiment of the present invention is superior to those of the comparative examples 1–3 in the cycle life. The reason for the long cycle life of the battery of the first embodiment is that the cycle life of the negative electrode was prolonged as a result of the improvement of the charge/discharge efficiency of the negative electrode. The improvement was induced by the successful suppression of the formation of dendrites onto the negative electrode during charge processes. On the other hand, the reason for the insufficient cycle life of the battery of the comparative example 1 is that the globular precipitate of lithium freed since the solvent escaped from the gel electrolyte onto the lithium negative electrode. The small discharge capacity of the battery of the comparative example 2 results from the absence of ionic conductivity of the polymer film which was formed on the lithium sheet and the resultant overvoltage of the battery reaction. The reason for the insufficient cycle life of the battery of the comparative example 3 is that the polymer film did not serve as a sieve for the solvent molecules. In other words, in preparing the polymer film, a large number of solvated ions ran into the polymer film from the gel electrolyte, and as a result, huge tunnels or cavities containing a large number of these solvated ions were formed.

EMBODIMENT 2

Another flat-type battery was manufactured in the same manner as in the first embodiment except for the following points. Polymeric monomers were synthesized, which can adjust the size of tunnels or cavities to the number of ethylene oxide units contained in the ethylene oxide-bound trimethylol propane triacrylate represented by the above-mentioned formula (5). The details of the polymeric monomers considered are shown in Table 1 below.

TABLE 1

| Number of ethylene oxide unit "n" | molecular weight/ polymer group number | cycle life |
|---|---|---|
| 2 | 186.7 | 210 |
| 4 | 274.7 | 238 |
| 6 | 362.7 | 247 |
| 8 | 450.7 | 226 |
| 10 | 538.7 | 112 |
| Comparative example | — | 103 |

In the table, polymer group number refers to the number (=3) of acrylic groups of monomer terminals.

In the same manner as in the first embodiment, a charge/discharge cycle was repeated under the conditions of a current density of 0.25 $mA/cm^2$, a lower limit discharge voltage of 2.0 V, and an upper limit charge voltage of 3.5 V. The cycle life was regarded as ended when the discharge capacity dropped to half of the initial value. Table 1 indicates that the cycle life becomes the longest when the number of ethylene oxide units is 6, and the cycle life rapidly falls when the number becomes 10. This is because the polymer film formed on the lithium negative electrode does not serve as a molecular sieve.

EMBODIMENT 3

Another flat-type battery was manufactured in the same manner as in the first embodiment except that the polymeric monomer of propylene oxide-ethylene oxide-bound trimethylol propane triacrylate represented by the formula (6) was used as a material for the polymer film formed on the lithium sheet.

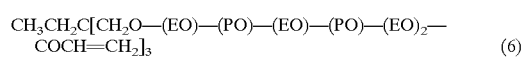

(6)

Where EO refers to $CH_2CH_2O$, and PO refers to $CH_2CH(CH_3)O$.

In the same manner as in the first embodiment, a charge/discharge cycle was repeated under the conditions of a current density of 0.25 $mA/cm^2$, a lower limit discharge voltage of 2.0 V, and an upper limit charge voltage of 3.5 V. The cycle life was regarded as ended when the discharge capacity dropped to half of the initial value.

Figure 3:
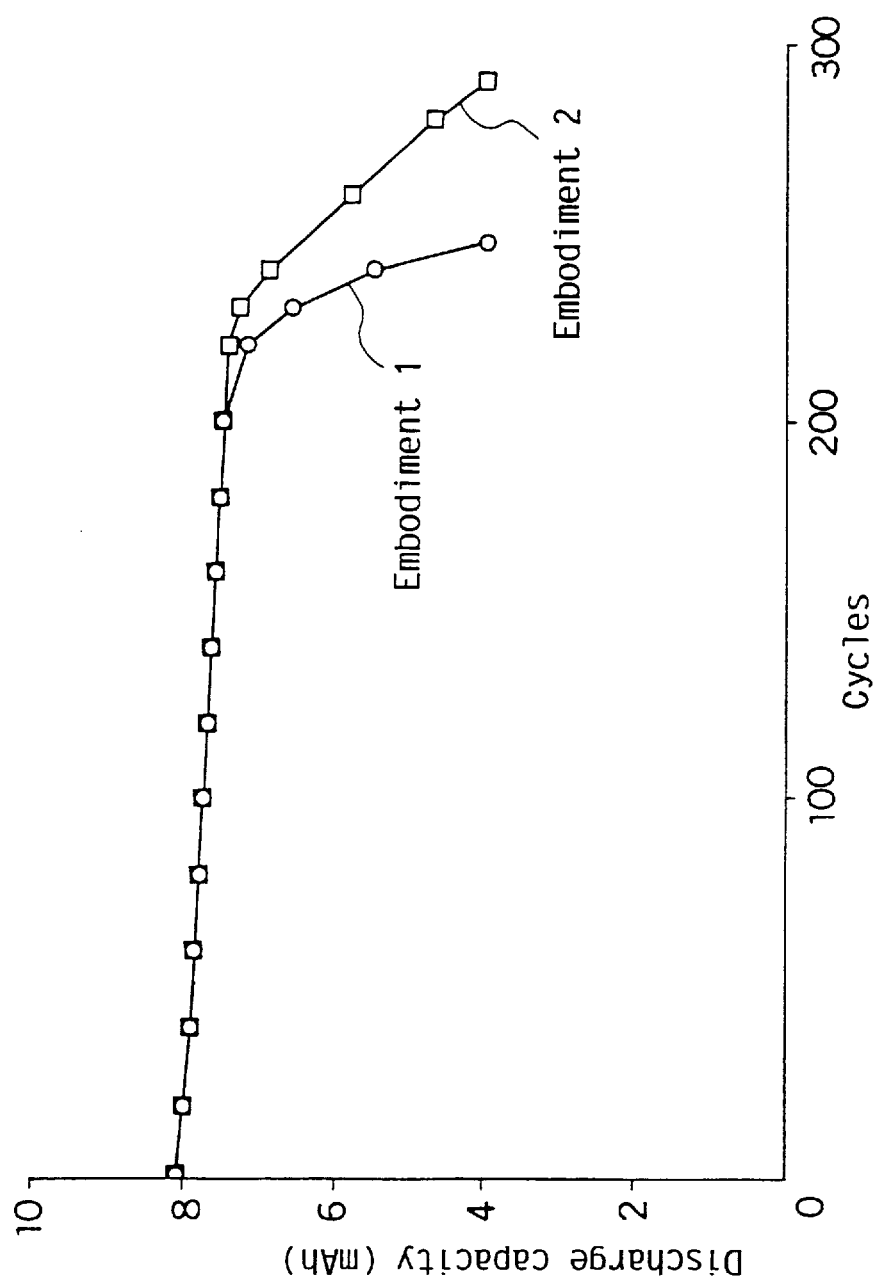
FIG. 3 is a graph showing the discharge capacity plotted for each cycle of the batteries used in the other embodiments of the present invention.

FIG. 3 is a graph showing the discharge capacity which was plotted for each cycle of the batteries of the first and third embodiments. This graph indicates that the battery of the third embodiment is superior to that of the first embodiment in the cycle life. It is believed that the presence of methyl groups in propylene oxide units interferes with the movement of solvent molecules onto the lithium electrode.

EMBODIMENT 4

Another flat-type battery was manufactured in the same manner as in the first embodiment except that an ethylene oxide-added multifunctional acrylate monomers represented by the above-mentioned formula (5) in which n=8, and also by the following formulas (7), (8) and (9) was synthesized as a material for the polymer film formed on the lithium sheet.

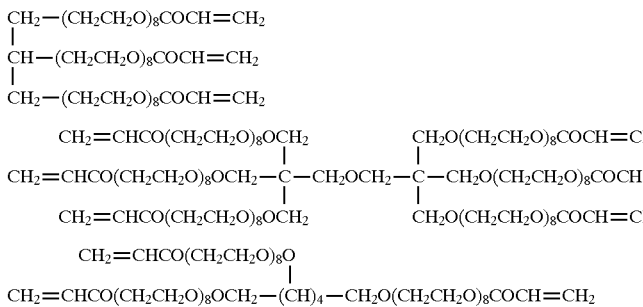

(7)

(8)

(9)

In the same manner as in the first embodiment, a charge/discharge cycle was repeated under the conditions of a current density of 0.25 mA/cm$^2$, a lower limit discharge voltage of 2.0 V, and an upper limit charge voltage of 3.5 V. The cycle life was regarded as ended when the discharge capacity dropped to half of the initial value. The results are shown in Table 2 below.

TABLE 2

| polymeric monomer | cycle life |
|---|---|
| formula (5) | 226 |
| formula (7) | 235 |
| formula (8) | 266 |
| formula (9) | 284 |

Table 2 indicates that the charge/discharge cycle lives were all excellent when the polymeric monomers represented by the formulas (5)–(9) were used. It is particularly noted that the cycle number increases as the number of polymeric terminal functional groups increases. The reason for this is that as the number of the polymeric terminal functional groups increases the effect as a sieve for the solvent molecules increases.

As explained above, the present invention provides a highly reliable, long-lived non-aqueous electrolyte secondary battery by suppressing the formation of dendrites during repeated charge/discharge cycles.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte secondary battery comprising:

a positive electrode, an alkali ion-conductive electrolyte, and a negative electrode containing an alkali metal as an active material, said negative electrode being provided with a polymer film thereon, said polymer film being made of a polymeric monomer having molecular weight/terminal polymer functional group number of 500 or less, and having a structure selected from the group consisting of formulas (1)–(4):

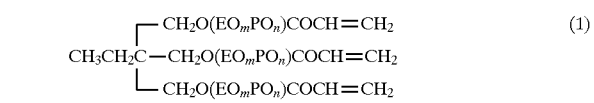

(1)

(2)

(3)

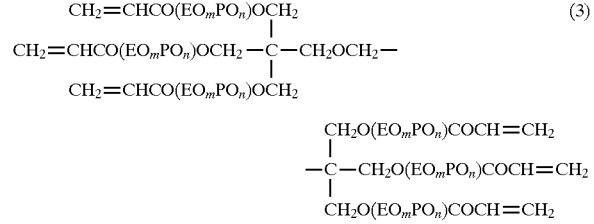

(4)

wherein EO refers to $CH_2CH_2O$, PO refers to $CH_2(CH_3)$ CHO, $(EO_mPO_n)$ indicates one of random polymerization and block polymerization, and wherein m and n do not represent 0 at the same time where $0 \leq m$ and $0 \leq n$.

2. The non-aqueous electrolyte secondary battery of claim 1, wherein a gel electrolyte is disposed between said positive electrode and said polymer film.

3. A method for manufacturing a non-aqueous electrolyte secondary battery comprising a positive electrode, an alkali ion-conductive electrolyte, and a negative electrode containing an alkali metal as an active material, said method comprising the steps of:

preparing a solution consisting essentially of a monomer and an alkali metal salt, said monomer having molecular weight/terminal polymer functional group number of 500 or less, and having a structure selected from the group consisting of formulas (1)–(4):

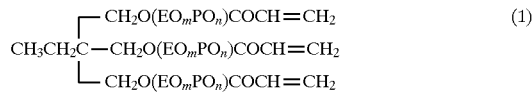

(1)

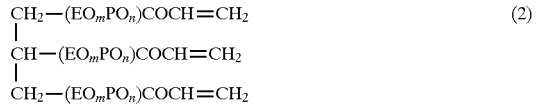

(2)

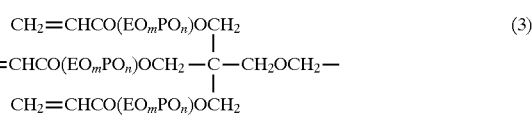

(3)

-continued

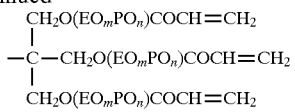

 (4)
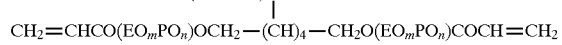

wherein EO refers to $CH_2CH_2O$, PO refers to $CH_2(CH_3)CHO$, $(EO_mPO_n)$ indicates one of random polymerization and block polymerization, and wherein m and n do not represent 0 at the same time where $0 \leq m$ and $0 \leq n$, applying said solution on said negative electrode, polymerizing said monomer in said solution to form a film containing dissociated ions of said alkali metal salt, and disposing a gel electrolyte onto said film.

* * * * *